United States Patent [19]

Hutto et al.

[11] 4,085,964

[45] Apr. 25, 1978

[54] VEHICLE INSECT PROTECTION APPARATUS

[76] Inventors: Ernest L. Hutto, 608 Lillian Dr., Orlando, Fla. 32806; Charles A. Tovey, 1660 Cheyenne Trail, Maitland, Fla. 32751

[21] Appl. No.: 722,827

[22] Filed: Sep. 13, 1976

[51] Int. Cl.² .................. B60J 1/20; B60K 11/04
[52] U.S. Cl. ..................................... 296/91; 180/68 P
[58] Field of Search .................. 296/91, 15; 180/68 P, 180/69 R; 160/DIG. 1

[56] References Cited

U.S. PATENT DOCUMENTS

| | | | |
|---|---|---|---|
| 3,015,517 | 1/1962 | Thornburgh | 296/91 X |
| 3,815,700 | 6/1974 | Mittendorf | 180/68 P |

*Primary Examiner*—John A. Pekar

*Attorney, Agent, or Firm*—Duckworth, Hobby, Allen & Pettis

[57] ABSTRACT

An apparatus for protecting moving vehicles from insects is attachable to an air current deflector shield, which is attached to the hood of the vehicle by a bracket extending under the front lip of the vehicle hood. A flexible, mesh screen of a predetermined shape, has a flexible reinforcing edge material attached to the periphery thereof and snap fasteners located along one edge portion which meet with mating snap fasteners attached to the deflector shield bracket attached to the vehicle hood, so that the screen can be rapidly attached and removed from the deflector shield. A plurality of flexible resilient straps are attached to the edge reinforcing material and have hook connectors for connecting to the bottom of the bumper, so that the screen is held in position between the deflector shield and the bumper to cover the grill and radiator area of the vehicle.

7 Claims, 4 Drawing Figures

VEHICLE INSECT PROTECTION APPARATUS

BACKGROUND OF THE INVENTION

The present invention relates to a vehicle protection device for preventing insects and other materials from messing up the front end of a moving vehicle and from stopping up the radiator of the vehicle.

In the past, it has been common to provide a great many deflectors for placement on different portions of a vehicle for controlling air currents, and preventing the windshields from becoming messed up. Some of these prior devices provide deflectors placed on the hood for controlling air currents or deflecting insects to prevent the insects from splattering against the windshield and from getting into the automobile. One such prior U.S. Pat. No. 3,015,517 to Thornburgh teaches an air current deflector shield which is supported on an angle bracket which is bolted to the underside of the front hood lip so as not to damage or mar the exterior surface of the vehicle. This deflector shield has been found adequate for deflecting insects and the like from colliding with the windshield of the moving vehicle, but offers no protection for the front decorative grill and radiator which can become clogged from large members of bugs and other materials, thereby reducing the efficiency of the cooling system of the vehicle and of the air conditioning system. A great many patents have been directed towards placing types of screens over the radiator portion of the front end of the vehicle to allow the passing of air but to prevent the entrance of insects and trash. Some of these have also been combined with air deflectors to protect the windshield. Typical of these prior art patents are the Hagglund U.S. Pat. No. 2,792,254, for a bug and gravel shield for vehicles having a deflector shield for deflecting the air and objects away from the front windshield as well as a screen for the radiator. U.S. Pat. No. 1,706,447, teaches a radiator protector having a screen attachable to the hood ornament of the vehicle while U.S. Pat. No. 2,173,338, to Morris, for a radiator screen buckles a screen to the front of the radiator. U.S. Pat. No. 2,263,357, to Hanson, has screens with belts for attaching to automobile radiators, while the Biewald U.S. Pat. No. 2,868,308, teaches a bug shield for automobiles having both screen and deflectors. The Pfingsten U.S. Pat. No. 2,778,439, teaches a combination radiator screen and insect deflector for vehicles, while the Mittendorf, et al., U.S. Pat. No. 3,831,696, teaches a vehicle insect protection apparatus having a deflector shield and radiator protection screen attachable through a framework which may be attached to the front bumper of the vehicle. The present invention, on the other hand, provides a screen which is specifically adapted to use with an air current deflector shield such as taught in the Thornburgh patent which can be rapidly attached and removed from the deflector shield to provide the additional coverage for the grill and radiator.

SUMMARY OF THE INVENTION

A vehicle insect protection apparatus is provided having an air current deflector shield attachable to the hood of a vehicle by a bracket extending under the front lip of the vehicle hood and having a flexible mesh screen of a predetermined shape for attachment to the air current deflector shield. The flexible mesh screen has a flexible reinforcing edge material preformed of polyvinyl chloride material and attached and reinforced at the corners of the screen. The snap fasteners have one portion attached to the air current deflector shield and the other portion attached to the reinforcing PVC of the screen whereby the screen can be snapped on to the angled bracket of the air current deflector shield. A plurality of flexible, resilient bumper straps may have hooks on one end for stretching to hook to the bottom of the vehicle bumper. The method of adapting the screen to the existing air current deflector shield provides for drilling holes through the angle iron shaped bracket front portion and riveting one half of the snap fasteners in a predetermined location to coincide with the other half of the snap fasteners previously located on the reinforcing PVC of the screen.

BRIEF DESCRIPTION OF THE DRAWINGS

Other objects, features, and advantages of this invention will be apparent from a study of the written description and the drawings in which.

DESCRIPTION OF THE PREFERRED EMBODIMENT

Figure 1:
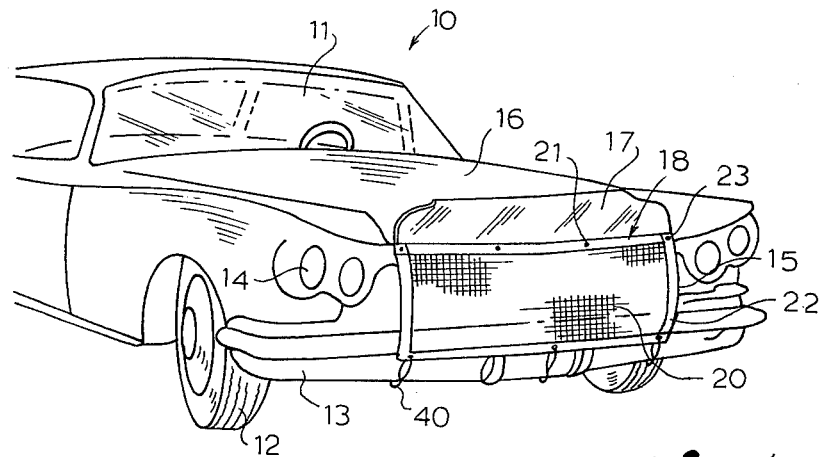
FIG. 1 is a perspective view of an automobile having a vehicle insect protection screen of the present invention attached thereto.
Figure 2:
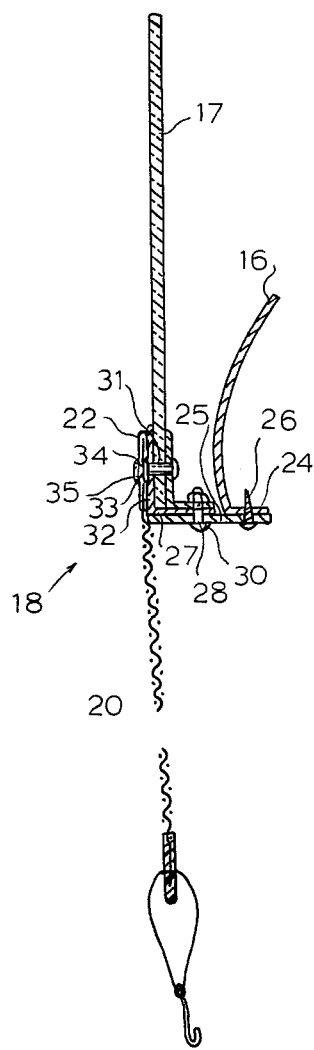
FIG. 2 is a sectional view taken through the air current deflector shield attached to the hood of the vehicle and through the attached screen.
Figure 3:
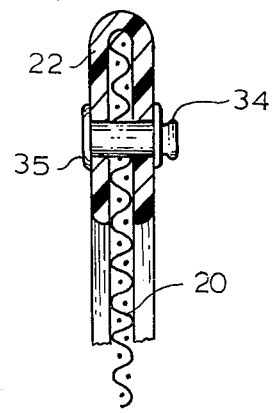
FIG. 3 is a sectional view taken on the line 3—3 of FIG. 4.

Referring now to FIG. 1 of the drawings an automobile 10 is illustrated having a windshield 11, tires 12, front bumper 13, front lights 14, a front grill 15, and a hood 16. The vehicle has an air current deflector shield 17 which may be similar to the air current deflector shield of U.S. Pat. No. 3,015,517, to Thornburgh and may be a clear plastic material having an attachment bracket 18 supporting the deflector portion 17. The supporting bracket 18 has the front screen 20 having snap fastener portions 21 attached to mating snap fastener portions attached to the supporting bracket 18. The protection screen 20 has reinforcing material 22, which may be polyvinyl chloride, shaped in cross-section like a U for attaching to the screen 20 along the periphery such as by sewing the screen 20 to the reinforcing edges 22. The reinforcing edges 22 may have corner reinforcements 23 such as small rivets or the like connecting the horizontal elongated reinforcing material with the vertically extending reinforcing edges. As can be more clearly seen in FIG. 2 the hood 16 has a lip 24 on the front portion thereof which has a bracket 18 horizontal arm 25 extending thereunder and anchored with metal screws 26. This advantageously allows the attachment of the shield 17 to the front of the vehicle without damaging or marring the exterior surface of the vehicle, and thus allows the removal of the shield 17 without any visible evidence the shield was ever attached thereto. The shield 17 has the horizontal bracket portion 25 having an angled rear supporting bracket 28 bolted with bolts 30 and also a front extending angle bracket 27 also supported by the nut 30 to the bracket member 25.

Figure 4:
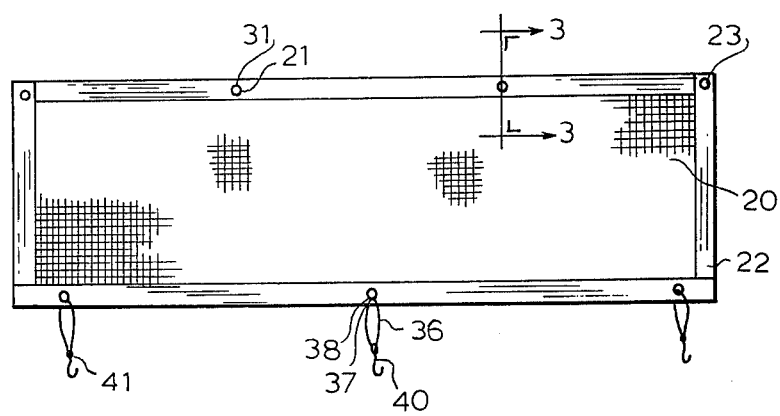
FIG. 4 is a front-plan view of the flexible mesh screen ready for attachment to a vehicle.

In the present invention, openings 31 are drilled through the existing angled brackets 25, shield 17, and angled bracket 28 at predetermined locations and one half of a snap fastener such as the male portion 32 is anchored thereto by a rivet 33 passing through the snap fastener 32 and opening 31 to lock the snap fastener to the shield support bracket 18. The other half of the snap fastener or female portion 34 is illustrated attached to the reinforcing material 22 by a rivet 35 or the like. The screen 20 is also attached to the periphery reinforcing 22. The bottom portion of the reinforcing material can be seen in FIG. 4 as having flexible, resilient straps or bungee cords 36 attached through openings 37 having grommets 38 therein. Hooks 40 are attached to the other end of the straps 36 so that the straps 36 can be stretched and the hooks 40 connected to the bottom of the bumper as illustrated in FIG. 1 to tightly stretch the screen 20 over the grill 15 of the vehicle.

In order to make and attach the present screen requires that the screen 20 be cut to a predetermined shape and have a special design and extruded polyvinyl chloride reinforcing material 22 attached to the periphery thereof and reinforced at the corners with rivets 23. The opening must then be drilled or punched at 38 along the bottom portion of the screen 20 and reinforcing grommets 37 attached thereto and bungee cords 36 having hooks 40 attached through openings 37. The bungee cords may also have adjustable brackets 41 for adjusting for different types of automobiles and bumpers. Openings 31 must be drilled at points in the top portion of the screen 20 within the reinforcing material 22 and one half of the snap fasteners riveted thereto. Bracket 18 for supporting the air deflector shield 17 must have matching openings drilled therein and snap fasteners riveted thereto for accepting the snap fastener portions 21 so as to exactly line up with the snap fasteners on the screen 20. Thus, the present invention allows a simple and inexpensive, but sturdy screen for quick attachment and detachment for existing air deflector shields on vehicles which also avoids marring the exterior of the vehicle. The present invention, however, is not to be construed as limited to the particular forms disclosed herein since these are to be regarded as illustrative rather than restrictive.

We claim:

1. A vehicle insect protection apparatus having an air current deflector shield attachable to the hood of a vehicle by an elongated bracket extending transversely to and under a front lip of a vehicle hood, the improvement comprising:

a flexible mesh screen shaped to fit over a portion of the front end of a vehicle and having at least two flexible reinforcing edges on the periphery thereof;

fastener means having a plurality of portions thereof attached to said air current deflector shield bracket and a plurality of mating portions attached to one said flexible screen reinforcing edge at predetermined positions thereon;

a plurality of flexible, strap bumper fasteners attached to a second said flexible reinforcing edge for attaching said screen to a bumper of a vehicle whereby a rapidly attaching insect screen may be attached to an existing air deflector.

2. The apparatus in accordance with claim 1 in which each of said plurality of flexible strap bumper fasteners is a resilient material and has a bumper hook attached thereto for attaching said strap to a bumper.

3. The apparatus in accordance with claim 2 in which said fastener means has plurality of snap fastener portions attached to said air current deflector shield bracket and a plurality of snap fastener portions attached to said one flexible reinforcing edge at predetermined positions to mate with said portion attached to said air current deflector shield bracket.

4. The apparatus in accordance with claim 3 in which each said flexible screen flexible reinforcing edge is extruded polyvinyl chloride having a generally U-shape cross section.

5. The apparatus in accordance with claim 4 in which each said polyvinyl chloride reinforcing edge has reinforcing rivets therethrough.

6. The apparatus in accordance with claim 4 in which said second flexible reinforcing edge has openings therein reinforced with metal grommets for accepting said flexible strap bumper fasteners.

7. The method of attaching an insect protection screen having a flexible mesh screen with a plurality of reinforcing edges to an air current deflector shield of a vehicle, one of said reinforcing edges including snap fastener portions located at predetermined positions thereon, a plurality of flexible, resilient cords having hooks thereon and being attached to a second of said reinforcing edges, and said air current deflector shield having an elongated support bracket for supporting said shield and being attached to a hood of a vehicle, said method comprising the steps of drilling openings into one side of said air current elongated deflector shield support bracket at predetermined locations; riveting one portion of a snap fastener in each opening drilled in said air current deflector support bracket; attaching said air current deflector support bracket to the hood of a vehicle with screws to an underside lip of the front of the vehicle hood; snapping said snap fastener portions located at predetermined positions on said one of said reinforcing edges of said flexible mesh screen to said mating snap fastener portions on said support bracket for said air current deflector shield; and stretching a plurality of said flexible resilient cords having hooks thereon and being attached to said second of said reinforcing edges on said screen to connect said hooks to the bottom edge of a bumper of the vehicle.

* * * * *